(12) United States Patent
Khanka et al.

(10) Patent No.: US 12,615,065 B2
(45) Date of Patent: Apr. 28, 2026

(54) SINGLE ANTENNA DESIGN SUPPORTING MULTIPLE BANDS

(71) Applicant: T-MOBILE INNOVATIONS LLC, Overland Park, KS (US)

(72) Inventors: Bhagwan Singh Khanka, Las Vegas, NV (US); Paul Henrich Antonio Gabriel, Las Vegas, NV (US)

(73) Assignee: T-Mobile Innovations LLC, Overland Park, KS (US)

( * ) Notice: Subject to any disclaimer, the term of this patent is extended or adjusted under 35 U.S.C. 154(b) by 72 days.

(21) Appl. No.: 18/520,082

(22) Filed: Nov. 27, 2023

(65) Prior Publication Data

US 2025/0175201 A1     May 29, 2025

(51) Int. Cl.
| | |
|---|---|
| *H01Q 21/28* | (2006.01) |
| *H01Q 1/24* | (2006.01) |
| *H01Q 15/14* | (2006.01) |
| *H04B 1/00* | (2006.01) |

(52) U.S. Cl.
CPC .......... *H04B 1/0064* (2013.01); *H01Q 1/246* (2013.01); *H01Q 15/14* (2013.01); *H01Q 21/28* (2013.01)

(58) Field of Classification Search
CPC ......... H01Q 1/246; H01Q 15/14; H01Q 21/28
See application file for complete search history.

(56) References Cited

U.S. PATENT DOCUMENTS

| | | |
|---|---|---|
| 2016/0242044 A1 | 8/2016 | Han et al. |
| 2021/0126351 A1* | 4/2021 | Hou ......................... H01Q 1/02 |
| 2023/0180131 A1 | 6/2023 | Kragten et al. |
| 2025/0097732 A1 | 3/2025 | Hegde |

FOREIGN PATENT DOCUMENTS

| | | | |
|---|---|---|---|
| WO | WO-2020072880 A1 * | 4/2020 | ......... H01Q 21/0025 |
| WO | 2022/216436 A1 | 10/2022 | |

OTHER PUBLICATIONS

Non-Final Office Action received for U.S. Appl. No. 18/404,054, mailed on Feb. 17, 2026, 21 pages.

* cited by examiner

*Primary Examiner* — Hoang V Nguyen
(74) *Attorney, Agent, or Firm* — Shook, Hardy & Bacon

(57) ABSTRACT

The technology disclosed herein relates to a modular antenna (a single multi-band antenna system) having various sets of antenna elements for transmitting a plurality of frequency bands. In some embodiments, the sets of antenna elements can be configured vertically in a column based on the frequency band (e.g., a first vertical column for low-band frequencies, a second vertical column for high-band frequencies, and third vertical column for millimeter wave frequencies). In other embodiments, the antenna elements that transmit longer wavelengths can be positioned around the antenna elements that transmit shorter wavelengths. Each portion of the modular antenna that includes a particular set of antenna elements corresponding to a particular frequency range can each have an individual dedicated reflector and separate printed circuit board. Further, each of the antenna elements of the modular antenna can have the same gain.

20 Claims, 5 Drawing Sheets

200

202
(mmwave)

204
(3100/3800 MHz)

206
(2100 MHz)

208
(1900 MHz)

210
(600/700 MHz)

210

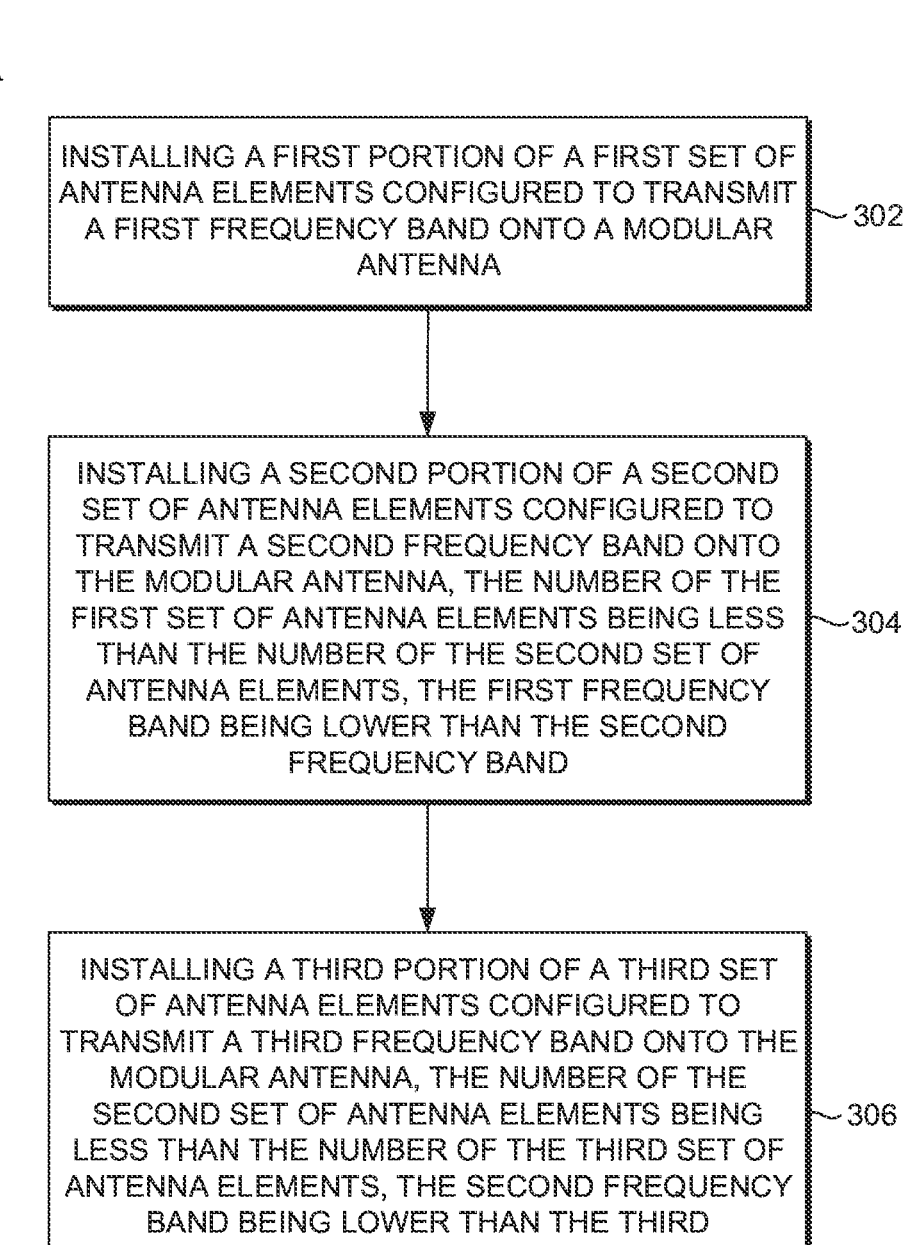

300

INSTALLING A FIRST PORTION OF A FIRST SET OF ANTENNA ELEMENTS CONFIGURED TO TRANSMIT A FIRST FREQUENCY BAND ONTO A MODULAR ANTENNA ⌐302

INSTALLING A SECOND PORTION OF A SECOND SET OF ANTENNA ELEMENTS CONFIGURED TO TRANSMIT A SECOND FREQUENCY BAND ONTO THE MODULAR ANTENNA, THE NUMBER OF THE FIRST SET OF ANTENNA ELEMENTS BEING LESS THAN THE NUMBER OF THE SECOND SET OF ANTENNA ELEMENTS, THE FIRST FREQUENCY BAND BEING LOWER THAN THE SECOND FREQUENCY BAND ⌐304

INSTALLING A THIRD PORTION OF A THIRD SET OF ANTENNA ELEMENTS CONFIGURED TO TRANSMIT A THIRD FREQUENCY BAND ONTO THE MODULAR ANTENNA, THE NUMBER OF THE SECOND SET OF ANTENNA ELEMENTS BEING LESS THAN THE NUMBER OF THE THIRD SET OF ANTENNA ELEMENTS, THE SECOND FREQUENCY BAND BEING LOWER THAN THE THIRD FREQUENCY BAND ⌐306

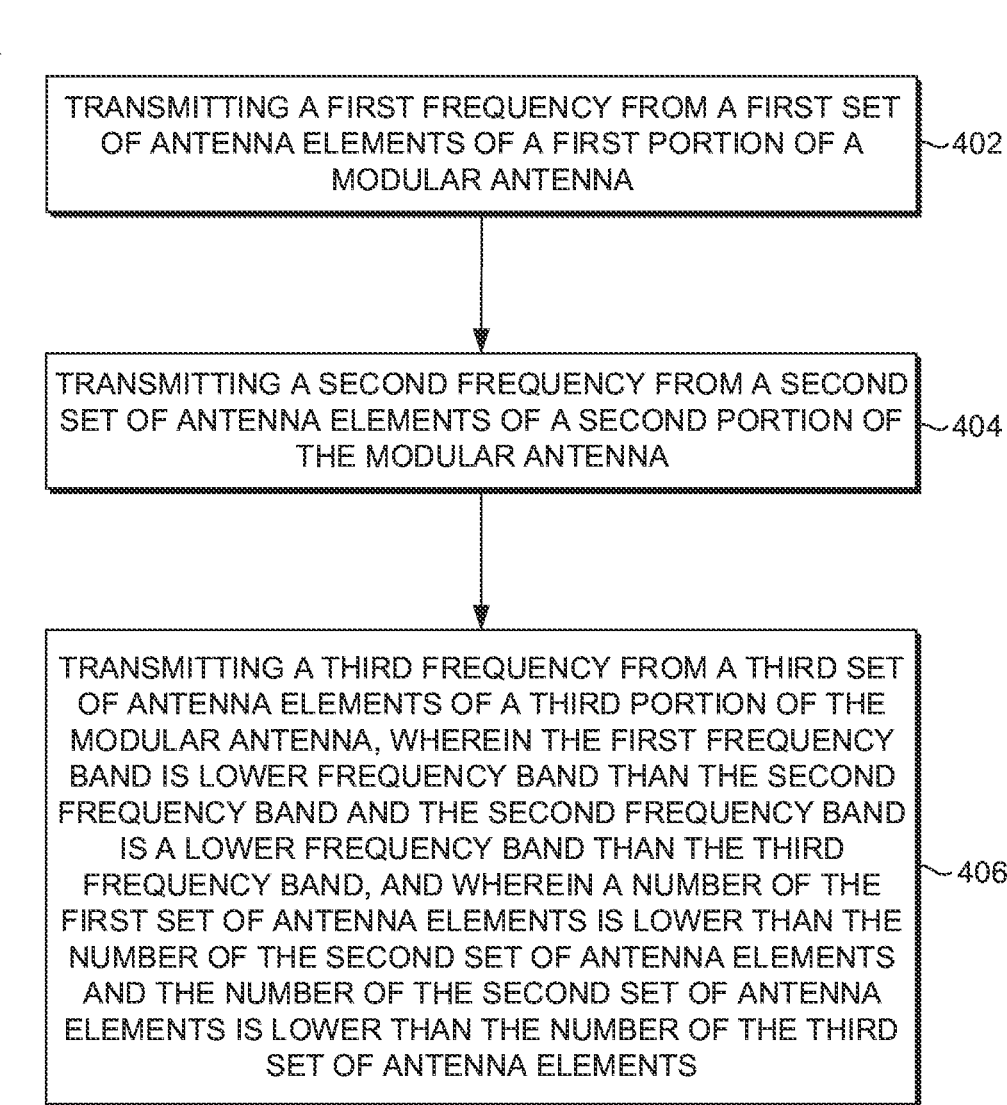

TRANSMITTING A FIRST FREQUENCY FROM A FIRST SET OF ANTENNA ELEMENTS OF A FIRST PORTION OF A MODULAR ANTENNA ~402

TRANSMITTING A SECOND FREQUENCY FROM A SECOND SET OF ANTENNA ELEMENTS OF A SECOND PORTION OF THE MODULAR ANTENNA ~404

TRANSMITTING A THIRD FREQUENCY FROM A THIRD SET OF ANTENNA ELEMENTS OF A THIRD PORTION OF THE MODULAR ANTENNA, WHEREIN THE FIRST FREQUENCY BAND IS LOWER FREQUENCY BAND THAN THE SECOND FREQUENCY BAND AND THE SECOND FREQUENCY BAND IS A LOWER FREQUENCY BAND THAN THE THIRD FREQUENCY BAND, AND WHEREIN A NUMBER OF THE FIRST SET OF ANTENNA ELEMENTS IS LOWER THAN THE NUMBER OF THE SECOND SET OF ANTENNA ELEMENTS AND THE NUMBER OF THE SECOND SET OF ANTENNA ELEMENTS IS LOWER THAN THE NUMBER OF THE THIRD SET OF ANTENNA ELEMENTS ~406

*FIG. 4*

SINGLE ANTENNA DESIGN SUPPORTING MULTIPLE BANDS

SUMMARY

This summary provides a high-level overview of various aspects of the technology disclosed herein, and the detailed-description section below provides further description herein. This summary is not intended to identify key features or essential features of the claimed subject matter, nor is it intended to be used as an aid in isolation to determine the scope of the claimed subject matter. The present disclosure is directed, in part, to technology associated with a system comprising a single antenna design capable of supporting multiple bands, substantially as shown in and/or described in connection with at least one of the figures, and as set forth more completely in the claims.

In aspects set forth herein, and at a high level, the technology described herein relates to systems, methods, and computer storage media for supporting multiple bands in a single multi-band antenna system. The disclosed single multi-band antenna system can combine multiple sets of antenna elements for transmitting on a plurality of different frequency bands. The different sets of antennas may be arranged in various configurations, including in columns, rows, or other arrangements—depending on a mobile network operator's (MNO) preference. In a tri-band deployment, the single multi-band antenna system comprises a first set of antenna elements configured to transmit a first frequency band, a second set of antenna elements configured to transmit a second frequency band that is a higher frequency band than the first frequency band, and a third set of antenna elements configured to transmit a third frequency band that is a higher frequency band than the second frequency band.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein:

FIG. 3 illustrates an example flowchart for an improved antenna having multiple antenna elements for supporting multiple bands, in accordance with aspects herein;

FIG. 4 illustrates another example flowchart for an improved antenna having multiple antenna elements for supporting multiple bands, in accordance with aspects herein.

DETAILED DESCRIPTION

Figure 1:
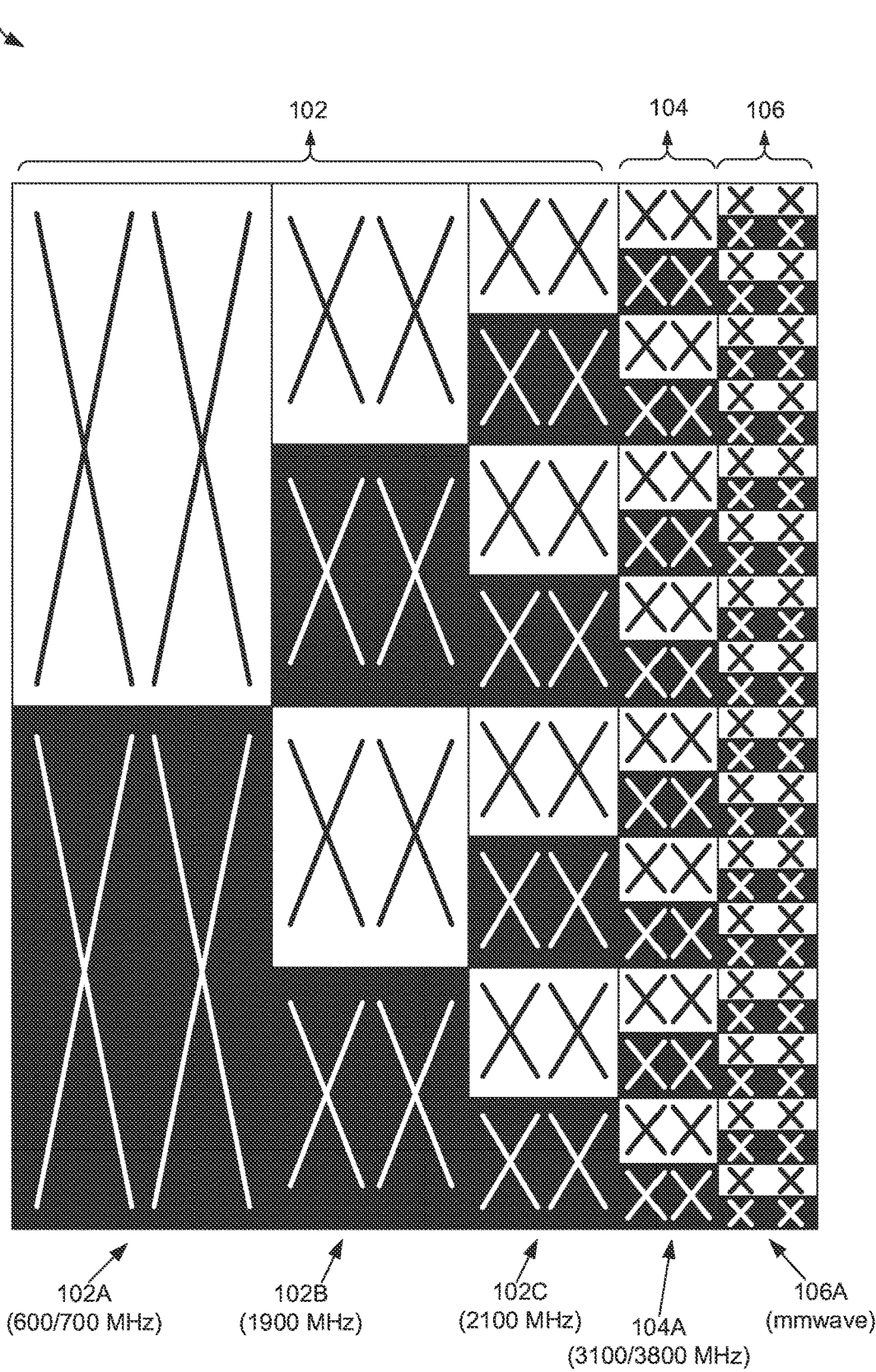
FIG. 1 depicts an example multi-band antenna configuration, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like. The term "node" is used to refer to an access point that transmits signals to a UE and receives signals from the UE in order to allow the UE to connect to a broader data or cellular network (including by way of one or more intermediary networks, gateways, or the like).

"Computer storage media" does not comprise signals per se.

The term "mm wave," as used herein, may refer to the extremely high frequency band (e.g., from 30 GHz to 300 GHz). Additionally or alternatively, in some embodiments, a millimeter wave transmission may include one or more frequency ranges of 24 gigahertz (GHz), 26 GHz, 28 GHz, 39 GHz, and 52.6-71 GHz.

A "low-band" frequency may refer to frequencies lower than 1000 megahertz (MHz), a "mid-band" frequency may refer to frequencies from 1000 MHz to 2300 MHz, and a "high-band" frequency may refer to frequencies higher than 2300 MHz (e.g., 3100 MHz or 3800 MHz).

The term "NAT," as used herein, is synonymous with wireless communication protocol and is an umbrella term used to refer to the particular technological standard/protocol that governs the communication between a UE and a base station. Examples of a NAT may include 3G, 4G, 5G, 6G, 802.11x, another type of NAT, or one or more combinations thereof.

Additionally, a "user device," as used herein, is a device that has the capability of transmitting or receiving one or more signals to or from an access point, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal). A user device may be, in an embodiment, user device 500 described herein with respect to FIG. 5.

In embodiments, a user device may include internet-of-things devices, such as one or more of the following: a sensor, controller (e.g., a lighting controller, a thermostat), appliances (e.g., a smart refrigerator, a smart air conditioner, a smart alarm system), other internet-of-things devices, or one or more combinations thereof. Internet-of-things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, other wireless communication devices, or one or more combinations thereof.

In some aspects, the user device is a wearable device having a camera, microphone, RFID, GPS, another sensor, or one or more combinations thereof. A wearable device (or another type of user device) can transmit the data obtained by their corresponding sensor(s) (e.g., to another user device, to a server). In embodiments, a user device can access sensors, application data, tracking data, map data, other user device data, or one or more combinations thereof, for packet transmissions (e.g., to another user device). In some embodiments, a wearable device can be a watch-type electronic device, a glasses-type wearable device, an upper-torso wearable device, another type of wearable device, or one or more combinations thereof.

In embodiments, a user device discussed herein may be configured to communicate using one or more of 4G (e.g., LTE), 5G, 6G, another generation communication system, or one or more combinations thereof. In some aspects, the user device may be an EN-DC user device. In some embodiments, the user device can connect to a 5G gNB that acts as a master node, and another type of node that acts as a secondary node.

A "network" can provide one or more wireless telecommunication services and may transmit or receive a wireless signal to or from a user device. In embodiments, a network may be one or more telecommunications networks, or a portion thereof. The network might include an array of devices or components (e.g., an antenna design described in FIG. 1 or FIG. 2). Additionally or alternatively, the network can include multiple networks, and the network can be a network of networks. In embodiments, the network or a portion thereof may be a core network, such as an evolved packet core or 5G core, which may include a control plane entity (e.g., a mobility management entity), a user plane entity (e.g., a serving gateway), and an access and mobility management function. In some embodiments, the network may comprise one or more public or private networks—wherein one or more of which may be configured as a satellite network (e.g., a 3GPP non-terrestrial network), a publicly switched telephony network, a cellular telecommunications network, another type of network, or one or more combinations thereof.

In embodiments, the network may comprise the satellite network connecting one or more gateways (e.g., a device or a system of components configured to provide an interface between the network and a satellite) to other networks, a cellular core network (e.g., a 4G, 5G, of 6G core network, an IMS network, and the like), a data network, another type of network, or one or more combinations thereof. In such embodiments, each of the satellite network and the cellular core network may be associated with a network identifier, such as a public land mobile network, a mobile country code, a mobile network code, or the like, wherein the network identifier associated with the satellite network is the same or different than the network identifier associated with the cellular network.

In embodiments, the network (including the satellite network) can connect one or more user devices to a service provider for services such as 5G and LTE, for example. In aspects, a service provided to a user device may comprise one or more of a voice service, a message service (e.g., SMS messages, MMS messages, instant messaging messages, an EMS service messages), a data service, other types of wireless telecommunication services, or one or more combinations thereof. The network can comprise any communication network providing voice, message, or data service(s), such as, for example, a 1× circuit voice, a 3G network (e.g., CDMA, CDMA2000, WCDMA, GSM, UMTS), a 4G network (WiMAX, LTE, HSDPA), a 5G network, a 6G network, another generation network, or one or more combinations thereof. Components of the network, for example, may include terminals, links, gateways, nodes (e.g., a core network node), relay devices, integrated access and backhaul nodes, other types of network components, or one or more combinations thereof.

As used herein, the term "base station" refers to a centralized component or system of components configured to wirelessly communicate (e.g., receive and/or transmit signals) with various devices or components (e.g., a user device, a relay device) in a particular geographical area. A base station may be referred to as one or more cell sites, nodes, gateways, remote radio unit control components, base transceiver stations, access points, NodeBs, eNBs, gNBs, Home NodeBs, Home eNodeBs, macro base stations, small cells, femtocells, relay base stations, another type of base station, or one or more combinations thereof. A base station may be, in an embodiment, configured with one or more antenna designs, such as an antenna design described in FIG. 1 or FIG. 2.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, to deploy multiple bands of spectrum from a particular site, more than one antenna is implemented, since the currently available antennas do not support all bands. With the installation of multiple antennas at one site, additional permits are need for the extra antennas and structural costs are also increased due to the implementation and maintenance involved with using these additional antennas. In addition, the implications of compacting these additional antennas at the site can present conflicting demands with respect to spacing and signal interference mitigation. For example, mitigating the distortion of radiation patterns among the antennas due to scattering from other radiating elements at the site or within the vicinity of the site can be challenging. At site utilizing multiple antennas having a plurality of radiation patterns, the high-frequency element patterns can be impacted by the scattering from the currents induced in low-frequency radiating elements and vice versa. This impact can be from various parameters, such as beamwidth, squint, cross-polarization discrimination, etc. The goal of ensuring that each radiating element is transparent to the other radiating elements with respect to their frequency bands is a challenging task.

One common conventional approach to mitigate this distortion of radiation patterns among the multiple antennas due to scattering has been to implement different shapes and sizes of metal cavities or walls for each of the various antennas. For example, in high-frequency band pattern distortions caused by the lower frequency band radiating elements, chokes (quarter-wavelength open-circuit segments at high band frequencies) have been introduced into the lower frequency band radiating elements. Additionally, filtering techniques have also been employed to obtain better isolation between radiating elements among the different antennas. Although these conventional techniques have somewhat reduced this cross-band scattering, these techniques also require significant modifications to low-frequency band or high-frequency band elements, which can significantly increase manufacturing strategies and costs due to the added complexities.

Accordingly, aspects of the presently disclosed technology provide various improvements for improving configurations of antennas providing multiple bands and enhancing wireless telecommunication services provided to user devices by various base stations. For example, the presently disclosed technology reduces or eliminates the distortion of radiation patterns discussed above with respect to the conventional technologies that implemented the multiple antennas that experienced the scattering effects. As another example, the presently disclosed technology reduces or eliminates problems associated with spatial diversity and multiple antennas and the reception on one antenna of the multiple antennas being subject to multi-path fading, since the presently disclosed technology involves a single antenna with particular antenna element configurations that do not experience this multi-path fading.

In an embodiment, a system comprises a modular antenna comprising a first portion having a first vertical column of a first set of antenna elements configured to transmit a first frequency band, a second vertical column of a second set of antenna elements configured to transmit a second frequency band that is a higher frequency band than the first frequency band, and a third vertical column of a third set of antenna elements configured to transmit a third frequency band that is a higher frequency band than the second frequency band.

The modular antenna can also comprise a second portion having a vertical column of antenna elements configured to transmit a fourth frequency band that is a higher frequency band than the third frequency band. The modular antenna can also comprise a third portion having a vertical column of antenna elements configured to transmit a fifth frequency band that is a higher frequency band than the fourth frequency band, wherein the number of the first set of antenna elements of the first portion of the modular antenna is less than the number of the second set of antenna elements, which is less than the number of the third set of antenna elements, which is less than the number of antenna elements of the second portion, which is less than the number of antenna elements of the third portion.

In another embodiment, a method for providing telecommunication services to a user device via a modular antenna can comprise transmitting a first frequency from a first set of antenna elements of a first vertical column of a modular antenna. The method can also comprise transmitting a second frequency from a second set of antenna elements of a second vertical column of the modular antenna. The method can also comprise transmitting a third frequency from a third set of antenna elements of a third vertical column of the modular antenna, wherein the first frequency band is lower frequency band than the second frequency band and the second frequency band is a lower frequency band than the third frequency band, and wherein a number of the first set of antenna elements is lower than the number of the second set of antenna elements and the number of the second set of antenna elements is lower than the number of the third set of antenna elements.

Another embodiment includes a modular antenna (a single multi-band antenna system) comprising a first portion having a first set of antenna elements configured to transmit one or more millimeter wave frequency bands. The modular antenna can also comprise a second portion having a second set of antenna elements configured to transmit one or more frequency bands having a lower frequency band than the one or more millimeter wave frequency bands, wherein the second portion surrounds the first portion, and wherein a number of the first set of antenna elements is larger than the number of the second set of antenna elements. The modular antenna can also comprise a third portion having a third set of antenna elements configured to transmit one or more frequency bands having a lower frequency band than the one or more frequency bands of the second portion, wherein the third portion surrounds the second portion, and wherein a number of the second set of antenna elements is larger than the number of the third set of antenna elements.

Turning now to FIG. 1, example modular antenna 100 is illustrated in accordance with one or more embodiments disclosed herein. At a high level, the example modular antenna 100 comprises a first portion 102, a second portion 104, and a third portion 106, each comprising a plurality of antenna elements (each represented by an "X") for transmitting a plurality of frequency bands (e.g., including millimeter waves) in a particular direction (e.g., for reception by one or more user devices).

The first portion 102 has a first vertical column 102A of a first set of antenna elements (e.g., four antenna elements, wherein the X represents two half wavelength polarizations) configured to transmit a first frequency band (e.g., a 600 MHz frequency band, a 700 MHz frequency band).

The first portion 102 also includes a second vertical column 102B of a second set of antenna elements (e.g., eight antenna elements) configured to transmit a second frequency band (e.g., 1900 MHz) that is a higher frequency band than the first frequency band. As illustrated in example modular antenna 100, the number of the first set of antenna elements of the first vertical column 102A is less than the number of the second set of antenna elements of the second vertical column 102B.

The first portion 102 also has a third vertical column 102C of a third set of antenna elements (e.g., sixteen antenna elements) configured to transmit a third frequency band (e.g., 2100 MHz) that is a higher frequency band than the second frequency band. The number of the second set of antenna elements of the second vertical column 102B is less than the number of the third set of antenna elements of the third vertical column 102C, as depicted in example modular antenna 100.

Example modular antenna 100 also has the second portion 104 having a fourth vertical column 104A of a fourth set of antenna elements (e.g., thirty two antenna elements) configured to transmit a fourth frequency band (e.g., 3100 MHz, 3800 MHz) that is a higher frequency band than the third frequency band. The third portion 106 of the modular antenna 100 has a fifth vertical column 106A of a fifth set of antenna elements (e.g., sixty four antenna elements) configured to transmit a fifth frequency band (e.g., millimeter waves) that is a higher frequency band than the fourth frequency band.

Example modular antenna 100 is but one example of a suitable environment for the technology and techniques disclosed herein, and is not intended to suggest any limitation as to the scope of use or functionality of the invention. Neither should the modular antenna 100 be interpreted as having any particular dependency or requirement relating to any one or combination of components illustrated. For example, other embodiments of example modular antenna 100 may have more or less portions than the first portion 102, the second portion 104, and the third portion 106.

In embodiments, the first vertical column 102A of the first set of antenna elements are mounted to transmit the first frequency band forwardly from a first reflector (e.g., the first reflector being positioned behind the "X" denoting the antenna elements), the second set of antenna elements are mounted to transmit the second frequency band forwardly from a second reflector, the third set of antenna elements are mounted to transmit the third frequency band forwardly from a third reflector, the fourth set of antenna elements are mounted to transmit the fourth frequency band forwardly from a fourth reflector, and the fifth set of antenna elements are mounted to transmit the fifth frequency band forwardly from a fifth reflector, such that each of the frequencies are transmitted toward the same direction (e.g., scanning away from a boresight direction of the antenna elements in an azimuth plane). In embodiments, the first set of antenna elements are each equidistance apart, the second set of antenna elements are each equidistance apart, the third set of antenna elements are each equidistance apart, the fourth set of antenna elements are each equidistance apart, and the fifth set of antenna elements are each equidistance apart.

In some embodiments, one or more of the fifth set of antenna elements for millimeter wave transmissions may be micro-strip patch antennas, horn antennas (e.g., for directional beamforming), another type of antenna element, or one or more combinations thereof. As one non-limiting example, an antenna element of the first vertical column 102A may be configured to transmit the first frequency band (e.g., a low-band frequency) by generating two antenna beams corresponding to a particular sector in the azimuth plane (e.g., one half wavelength having a polarization of +90 degrees and the other half polarization of −90 degrees for a 180 degree sector in the azimuth plane). In some embodiments, the fourth set of antenna elements (e.g., for high-band frequency 3100 MHz or 3800 MHz) having the same polarizations are excited simultaneously, and the fifth set of antenna elements (e.g., for millimeter wave frequency) having the same polarizations are excited simultaneously.

In embodiments, each of the vertical columns (e.g., the first vertical column 102A, the second vertical column 102B, the third vertical column 102C, the fourth vertical column 104A, and the fifth vertical column 106A) can be mounted on individual pole structures, such that each of the five individual pole structures are part of the modular antenna. In some embodiments, the individual pole structures of each of the first vertical column 102A, the second vertical column 102B, the third vertical column 102C, the fourth vertical column 104A, and the fifth vertical column 106A can be equidistant apart; or the distance between the pole structure of the first vertical column 102A and the pole structure of the second vertical column 102B can be a different distance than the distance between the pole structure of the fourth vertical column 104A and the pole structure of the fifth vertical column 106A, wherein each of the antenna elements of the portions 102, 104, and 106 are all facing the same direction. In some embodiments, the first portion 102, the second portion 104, and the third portion can be equidistant apart, or the distance between the first portion 102 and the second portion 104 can be a different distance than the distance between the second portion 104 and the third portion 106, wherein each of the antenna elements of the portions 102, 104, and 106 are all facing the same direction.

In other embodiments of example modular antenna 100, the pole structure of the fourth vertical column 104A may be adjacent to the pole structure of the second vertical column 102B, and the pole structure of the third vertical column 102C may be adjacent to the pole of the first vertical column 102A. In embodiments, based on the stacking of the antenna elements of each column (e.g., the lower number of antenna elements of the first vertical column 102A relative to the higher number of antenna elements of the second vertical column, the lower number of the antenna elements of the second vertical column 102B relative to the antenna elements in the third vertical column 102C, and so on), as illustrated in FIG. 1, the antenna elements of each vertical column are horizontally offset from the other respective antenna elements in the other vertical columns, such that the antenna elements of a vertical column are not directly aligned along a vertical axis (e.g., thereby not resulting in frequency band isolation or the reduction of scattering or interferences from other vertical columns). In embodiments, the gain corresponding to the antenna elements associated with the first vertical column 102A, the second vertical column 102B, the third vertical column 102C, the fourth vertical column 104A, and the fifth vertical column 106A can be identical or nearly identical.

In some embodiments, one or more of the dedicated reflectors of the vertical columns can be used to focus or direct a radiation pattern of the modular antenna. In some embodiments, one or more of the dedicated reflectors can include one or more of the following materials: metal (e.g., aluminum, steel), dielectric material (e.g., non-metallic material including insulating material), a mesh including a grid of metal or dielectric material, composite materials (e.g., carbon fiber composites), fiber glass, other types of reflector material, or one or more combinations thereof. In some embodiments, each of the dedicated reflectors are the same size for each of the vertical columns. In other embodiments, one or more of the vertical columns has a different sized dedicated reflector (e.g., the fifth vertical column 106A having a different size or material than the other vertical columns).

In embodiments, each of the vertical columns can have two of their own radio frequency ports, each of which may be connected via a feed network. In some embodiments, the feed network may include a beamforming network in response to radio frequency signal inputs at each of the two radio frequency ports on each of the vertical columns. The beamforming networks can be used for multiple-input multiple-output (MIMO) communications, for instance, a spatial stream for a 2×2 MIMO communication system (wherein the number of transmit chains (antennas) and the total number of receive chains (antennas) correspond to the "2×2"). In some embodiments, the two ports of the fifth vertical column 106A may have low loss characteristics a millimeter wave frequencies, impedance matching based on the dedicated reflector of the fifth vertical column 106A and the transmission lines (e.g., 50 ohms or 75 ohms), high isolation between the two ports or between ports of the other vertical columns, one or more specialized connectors (e.g., 2.92 mm connectors or 2.4 mm connectors), particular precisions components (e.g., circulators, isolators, attenuators, power dividers), other types of millimeter wave port characteristics, or one or more combinations thereof.

Each of the first vertical column 102A, the second vertical column 102B, the third vertical column 102C, the fourth vertical column 104A, and the fifth vertical column 106A can have their own individual printed circuit board that is not connected (i.e., physically separate) with the other vertical columns. In some embodiments, each of the vertical columns have different types of printed circuit boards. In other embodiments, one or more of the vertical columns have a different printed circuit board than another one of the vertical columns. In some embodiments, one or more of the vertical columns are connected to one or more other vertical columns via a backplane to form a panel.

In some embodiments, the printed circuit board (PCB) of the fifth vertical column 106A of the fifth set of antenna elements for millimeter wave transmissions may include one or more of the following materials: polytetrafluoroethylene, a ceramic base, a material other than glass fiber in the central portion, micro-strip transmission lines, coplanar waveguides, slot lines, other types of PCB materials for millimeter waves, or one or more combinations thereof. In some embodiments, the PCB for the fifth set of antenna elements for millimeter wave transmissions may be a multilayer PCB, a flexible PCB, a hybrid PCB (e.g., combination of material layers with varied dielectric constants), an integrated antenna package PCB, another type of PCB, or one or more combinations thereof.

In some embodiments, the modular antenna 100 can provide one or more services (e.g., an Internet browsing service, a Wi-Fi messaging service, Voice over IP, gaming, High Frequency Trading, a message service, SMS messages, MMS messages, an emergency medical service). In some embodiments, the modular antenna 100 can perform one or more of the following functions: transfer user data, radio channel ciphering, radio channel deciphering, integrity protection, header compression, mobility control functions (e.g., handover, dual connectivity), inter-cell interference coordination, connection setup and release, load balancing, distribution for non-access stratum messages, non-access stratum node selection, synchronization, RAN sharing, multimedia broadcast multicast service, subscriber and equipment trace, RAN information management, paging, positioning, beamforming (e.g., 2×2 MIMO communications), delivery of a warning message, another type of modular antenna functionality, or one or more combinations thereof. In some embodiments, the modular antenna 100 can include a relay, a small cell (e.g., a microcell, a picocell, a femtocell), a macro base station, gNB, eNB, a 6G network component, another type of base station component, or one or more combinations thereof.

Figure 2:
FIG. 2 depicts another example multi-band antenna configuration, in accordance with aspects herein.

Turning now to FIG. 2, example modular antenna 200 is illustrated in accordance with one or more embodiments disclosed herein. At a high level, the example modular antenna 200 comprises a first portion 202, a second portion 204, a third portion 206, a fourth portion 208, and a fifth portion 210, each comprising a plurality of antenna elements (each represented by an "X") for transmitting a plurality of frequency bands (e.g., including millimeter waves) in a particular direction (e.g., for reception by one or more user devices).

The first portion 202 has a first set of antenna elements configured to transmit one or more millimeter wave frequency bands (e.g., forty four antenna element pairs stacked within four columns, wherein an X represents two half wavelength polarizations) configured to transmit a first frequency band (e.g., millimeter wave frequencies). The second portion 204 has a second set of antenna elements configured to transmit one or more frequency bands (e.g., 3100 or 3800 MHz) having a lower frequency band than the one or more millimeter wave frequency bands, wherein the second portion 204 surrounds the first portion 202, and wherein a number of the first set of antenna elements is larger than the number of the second set of antenna elements.

The third portion 206 has a third set of antenna elements configured to transmit one or more frequency bands (e.g., 2100 MHz) having a lower frequency band than the second frequency band of the second portion 204, wherein the third portion 206 surrounds the second portion 204, and wherein a number of the second set of antenna elements is larger than the number of the third set of antenna elements. The fourth portion 208 has a fourth set of antenna elements configured to transmit one or more frequency bands (e.g., 1900 MHz) having a lower frequency band than the third frequency band of the third portion 206, wherein the fourth portion 208 surrounds the third portion 206, and wherein a number of the third set of antenna elements is larger than the number of the fourth set of antenna elements.

The fifth portion 210 has a fifth set of antenna elements configured to transmit one or more frequency bands (e.g., 600 or 700 MHz) having a lower frequency band than the fourth frequency band of the fourth portion 208, wherein the fifth portion 210 surrounds the fourth portion 208, and wherein a number of the fourth set of antenna elements is larger than the number of the fifth set of antenna elements.

Example modular antenna 200 is but one example of a suitable environment for the technology and techniques disclosed herein, and is not intended to suggest any limitation as to the scope of use or functionality of the invention. Neither should the modular antenna 200 be interpreted as having any particular dependency or requirement relating to any one or combination of components illustrated. For example, other embodiments of example modular antenna 200 may have more or less portions than the first portion 202, second portion 204, third portion 206, fourth portion 208, and fifth portion 210.

In embodiments, the first portion 202 has the first set of antenna elements mounted to transmit the first frequency band forwardly from a first reflector (e.g., the first reflector being positioned behind the "X" denoting the antenna elements), the second portion 204 has the second set of antenna elements mounted to transmit the second frequency band forwardly from a second reflector, the third portion 206 has the third set of antenna elements mounted to transmit the third frequency band forwardly from a third reflector, the fourth portion 208 has the fourth set of antenna elements mounted to transmit the fourth frequency band forwardly from a fourth reflector, and the fifth portion 210 has the fifth set of antenna elements mounted to transmit the fifth frequency band forwardly from a fifth reflector, such that each of the frequencies are transmitted toward the same direction (e.g., scanning away from a boresight direction of the antenna elements in an azimuth plane). In some embodiments, one or more of the dedicated reflectors of each portion can be used to focus or direct a radiation pattern of the modular antenna 200. In some embodiments, one or more of the dedicated reflectors can include one or more of the following materials: metal (e.g., aluminum, steel), dielectric material (e.g., non-metallic material including insulating material), a mesh including a grid of metal or dielectric material, composite materials (e.g., carbon fiber composites), fiber glass, other types of reflector material, or one or more combinations thereof.

In embodiments, the distance between the first portion 202 and the second portion 204 is equal to the distance between the second portion 204 and the third portion 206. Continuing the example, in some embodiments, this distance can be equivalent to the distance between the third portion 206 and the fourth portion 208. Continuing the example, in some embodiments, this distance can also be equivalent to the distance between the fourth portion 208 and the fifth portion 210. In other embodiments, a distance between one or more of the first portion 202 and second portion 204, the second portion 204 and third portion 206, the third portion 206 and fourth portion 208, and fourth portion 208 and fifth portion 210 may be different than one or more of another one of these distances.

In some embodiments, one or more of the first set of antenna elements for millimeter wave transmissions may be micro-strip patch antennas, horn antennas (e.g., for directional beamforming), another type of antenna element, or one or more combinations thereof. As one non-limiting example, an antenna element of the fifth portion 210 configured to transmit the fifth frequency band (e.g., a low-band frequency) by generating two antenna beams corresponding to a particular sector in the azimuth plane. In some embodiments, the second set of antenna elements (e.g., for high-band frequency 3100 MHz or 3800 MHz) that have the same polarizations are excited simultaneously, and the first set of antenna elements (e.g., for millimeter wave frequency) that have the same polarizations are also excited simultaneously. In some embodiments, each set of antenna elements that have the same polarizations may be excited simultaneously. In some embodiments, each of the antenna elements of FIG. 2 are configured to transmit in the same direction.

In embodiments, based on the stacking of the antenna elements of each portion (e.g., the lower number of antenna elements of the fifth portion 210 relative to the higher number of antenna elements of the fourth portion 208, the lower number of the antenna elements of the fourth portion 208 relative to the antenna elements in the third portion 206, and so on), as illustrated in FIG. 2, the antenna elements of each portion are either horizontally or vertically offset from the other respective antenna elements in the other portions, such that the antenna elements of modular antenna 200 are not directly aligned along a vertical or horizontal axis (e.g., thereby not resulting in frequency band isolation or the reduction of scattering or interferences from other portions). In embodiments, the gain corresponding to the antenna elements associated with each of the five portions can be identical or nearly identical.

In embodiments, each of the portions 202, 204, 206, 208, and 210 can have two of their own radio frequency ports, each of which may be connected via a feed network. In some embodiments, the feed network may include a beamforming network in response to radio frequency signal inputs at each of the two radio frequency ports on each of the portions. The beamforming networks can be used for multiple-input multiple-output (MIMO) communications, for instance, a spatial stream for a 2×2 MIMO communication system (wherein the number of transmit chains (antennas) and the total number of receive chains (antennas) correspond to the "2×2"). In some embodiments, the two ports of the first portion 202 may have low loss characteristics a millimeter wave frequencies, impedance matching based on the dedicated reflector and the transmission lines (e.g., 50 ohms or 75 ohms), high isolation between the two ports or between ports of the other portions, one or more specialized connectors (e.g., 2.92 mm connectors or 2.4 mm connectors), particular precisions components (e.g., circulators, isolators, attenuators, power dividers), other types of millimeter wave port characteristics, or one or more combinations thereof.

Each of the portions 202, 204, 206, 208, and 210 can have their own individual printed circuit board that is not connected (i.e., physically separate) with the other portions. In some embodiments, each of the portions have different types of printed circuit boards. In other embodiments, one or more of the portions have a different printed circuit board than another one of the portions. In some embodiments, one or more of the portions are connected to one or more other portions via a backplane to form a panel.

In some embodiments, the printed circuit board (PCB) of the first portion 202 of the first set of antenna elements for millimeter wave transmissions may include one or more of the following materials: polytetrafluoroethylene, a ceramic base, a material other than glass fiber in the central portion, micro-strip transmission lines, coplanar waveguides, slot lines, other types of PCB materials for millimeter waves, or one or more combinations thereof. In some embodiments, the PCB for the first set of antenna elements for millimeter wave transmissions may be a multilayer PCB, a flexible PCB, a hybrid PCB (e.g., combination of material layers with varied dielectric constants), an integrated antenna package PCB, another type of PCB, or one or more combinations thereof.

In some embodiments, the modular antenna 200 can provide one or more services (e.g., an Internet browsing service, a Wi-Fi messaging service, Voice over IP, gaming, High Frequency Trading, a message service, SMS messages, MMS messages, an emergency medical service). In some embodiments, the modular antenna 200 can perform one or more of the following functions: transfer user data, radio channel ciphering, radio channel deciphering, integrity protection, header compression, mobility control functions (e.g., handover, dual connectivity), inter-cell interference coordination, connection setup and release, load balancing, distribution for non-access stratum messages, non-access stratum node selection, synchronization, RAN sharing, multimedia broadcast multicast service, subscriber and equipment trace, RAN information management, paging, positioning, beamforming (e.g., 2×2 MIMO communications), delivery of a warning message, another type of modular antenna functionality, or one or more combinations thereof. In some embodiments, the modular antenna 200 can include a relay, a small cell (e.g., a microcell, a picocell, a femto-cell), a macro base station, gNB, eNB, a 6G network component, another type of base station component, or one or more combinations thereof.

Example Flowcharts

Having described the example embodiments discussed above, an example flowchart is described below with respect to FIG. 3. Example flowchart 300 begins at step 302 with installing a first portion of a first set of antenna elements configured to transmit a first frequency band. In some embodiments, the first portion includes a first vertical column of the first set of antenna elements configured to transmit the first frequency band (e.g., a low-band fre-quency), such that the first set of antenna elements includes at least one set of two antenna elements stacked above another pair of antenna elements. In some embodiments, the first set of antenna elements are configured to transmit the first frequency band (e.g., a low-band frequency) by gener-ating two antenna beams corresponding to a particular sector in the azimuth plane (e.g., one half wavelength having a polarization of +90 degrees and the other half polarization of −90 degrees for a 180 degree sector (or less) in the azimuth plane).

In other embodiments, step 302 begins with installing a first portion of a first set of antenna elements configured to transmit millimeter waves, such that at step 304, a second portion of a second set of antenna elements is installed around the first set of antenna elements (e.g., such that the second portion surrounds the first portion), wherein the second set of antenna elements are configured to transmit one or more frequency bands having a lower frequency band (e.g., a high-band frequency) than the one or more millime-ter wave frequency bands, such that the number of the first set of antenna elements is larger than the number of the second set of antenna elements (e.g., such as the example configuration of FIG. 2). In some embodiments, the modular antenna is configured for dual stream multiple-input mul-tiple-out 2×2 communications (e.g., 2×2 MIMO communi-cations via the first set of antenna elements and the second set of antenna elements).

Continuing the example with respect to the vertical col-umn configuration for the first set of antenna elements, at step 304, a second portion of a second set of antenna elements in a second vertical column is installed, wherein the second set of antenna elements are configured to transmit one or more frequency bands having a higher frequency band (e.g., a mid-band frequency, a high-band frequency) than the first vertical column, such that the number of the first set of antenna elements is smaller than the number of the second set of antenna elements (e.g., such as the example configuration of FIG. 1). In some embodiments, the second vertical column can have eight, sixteen, or thirty two antenna elements. In embodiments, the second set of antenna elements includes pairs of antenna elements stacked above another pair of antenna elements (e.g., a first pair stacked above a second pair, the second pair stacked above a third pair, the third pair stacked above a fourth pair, etc.).

At step 306, a third portion of a third set of antenna elements in a third vertical column is installed, wherein the third set of antenna elements are configured to transmit one or more frequency bands having a higher frequency band (e.g., millimeter waves) than the second vertical column, such that the number of the third set of antenna elements is larger than the number of the second set of antenna elements (e.g., such as the example configuration of FIG. 1). In some embodiments, the third vertical column can have sixty four antenna elements. In embodiments, the third set of antenna elements includes pairs of antenna elements stacked above another pair of antenna elements (e.g., a first pair stacked above a second pair, the second pair stacked above a third pair, the third pair stacked above a fourth pair, etc.).

In the alternative embodiment, at step 306, the third portion of the third set of antenna elements is installed around the second set of antenna elements (e.g., such that the third portion surrounds the second portion), wherein the third set of antenna elements are configured to transmit one or more frequency bands having a lower frequency band (e.g., a low-band frequency) than the second frequency band of the second set of antenna elements, such that the number of the second set of antenna elements is larger than the number of the third set of antenna elements (e.g., such as the example configuration of FIG. 2). In some embodiments, the modular antenna is configured for dual stream multiple-input multiple-out 2×2 communications (e.g., 2×2 MIMO communications via the second set of antenna elements and the third set of antenna elements, or the first set of antenna elements and the third set of antenna elements).

In some embodiments, each of the third portion, the second portion, and the first portion have an individual dedicated reflector. In some embodiments, the antenna ele-ments of each of the third portion, the second portion, and the first portion are centered on each of their respective dedicated reflectors, wherein each of the antenna element pairs on each portion is vertically aligned. In some embodi-ments, each of the antenna elements of the modular antenna have the same gain (or approximately the same gain). In some embodiments, a distance between the first portion and the second portion of the modular antenna is a different distance than the distance between the second portion and the third portion. In other embodiments, the distance between the first portion and the second portion of the modular antenna is the same distance as the distance between the second portion and the third portion. In some embodiments, each of the third portion, the second portion, and the first portion have separate and unconnected printed circuit boards.

Example flowchart 300 is but one example of a suitable flowchart for the technology and techniques disclosed herein, and is not intended to suggest any limitation as to the scope of use or functionality of the invention. Neither should the flowchart 300 be interpreted as having any particular dependency or requirement relating to any one or combina-tion of blocks illustrated. For example, other embodiments of flowchart 300 may begin with the installation of the third portion (e.g., as described via step 306) or may begin with the installation of the second portion.

Example flowchart 400 of FIG. 4 begins at step 402 with transmitting a first frequency from a first set of antenna elements of a first portion of a modular antenna. In some embodiments, the first portion is a single vertical column of stacked antenna element pairs for the transmission of low-band or mid-band frequencies. In other embodiments, the first portion is a plurality of vertical columns of stacked antenna element pairs (e.g., four vertically stacked antenna-element-paired columns having sixteen antenna elements per column, such as illustrated in FIG. 2) for the transmis-sion of millimeter waves.

At step 404, a second frequency is transmitted from a second set of antenna elements of a second portion of the modular antenna. In some embodiments, the second portion is a single vertical column of stacked antenna element pairs for the transmission of low-band or mid-band frequencies.

In this example embodiment, the number of the second set of antenna elements is larger than the number of the first set of antenna elements. In other embodiments, the second portion is positioned around the first set of antenna elements, such that at least two vertically stacked antenna element pairs of the second set of antenna elements surround two sides of the first set of antenna elements, and such that at least two horizontally stacked pairs of antenna elements of the second set of antenna elements surround the other two sides of the first set of antenna elements. In this embodiment, the number of the second set of antenna elements is smaller than the number of the first set of antenna elements, and the second frequency band transmitted by the second set of antenna elements is a lower frequency than the first frequency band transmitted by the first set of antenna elements.

At step 406, a third frequency from a third set of antenna elements of a third portion of the modular antenna is transmitted. In one example embodiment, the third portion is a single vertical column of stacked antenna element pairs for the transmission of millimeter wave frequencies. In this example embodiment, the number of the third set of antenna elements is larger than the number of the second set of antenna elements, and the second frequency band transmitted by the second set of antenna elements is a lower frequency than the third frequency band transmitted by the third set of antenna elements. In other embodiments, the third portion is positioned around the second set of antenna elements, such that at least two vertically stacked antenna element pairs of the third set of antenna elements surround two sides of the second set of antenna elements, and such that at least two horizontally stacked pairs of antenna elements of the third set of antenna elements surround the other two sides of the second set of antenna elements. In this embodiment, the number of the third set of antenna elements is smaller than the number of the second set of antenna elements, and the third frequency band transmitted by the third set of antenna elements is a lower frequency than the second frequency band transmitted by the second set of antenna elements.

Example flowchart 400 is but one example of a suitable flowchart for the technology and techniques disclosed herein, and is not intended to suggest any limitation as to the scope of use or functionality of the invention. Neither should the flowchart 400 be interpreted as having any particular dependency or requirement relating to any one or combination of blocks illustrated. For example, other embodiments of flowchart 400 may begin with the transmission of the third frequency band (e.g., as described via step 406) or may begin with the transmission of the second frequency band.

Example User Device

Having described the example embodiments discussed above of the presently disclosed technology, an example operating environment of an example user device is described below with respect to FIG. 5. User device 500 is but one example of a suitable computing environment, and is not intended to suggest any particular limitation as to the scope of use or functionality of the technology disclosed. Neither should user device 500 be interpreted as having any dependency or requirement relating to any particular component illustrated, or a particular combination of the components illustrated in FIG. 5.

Figure 5:
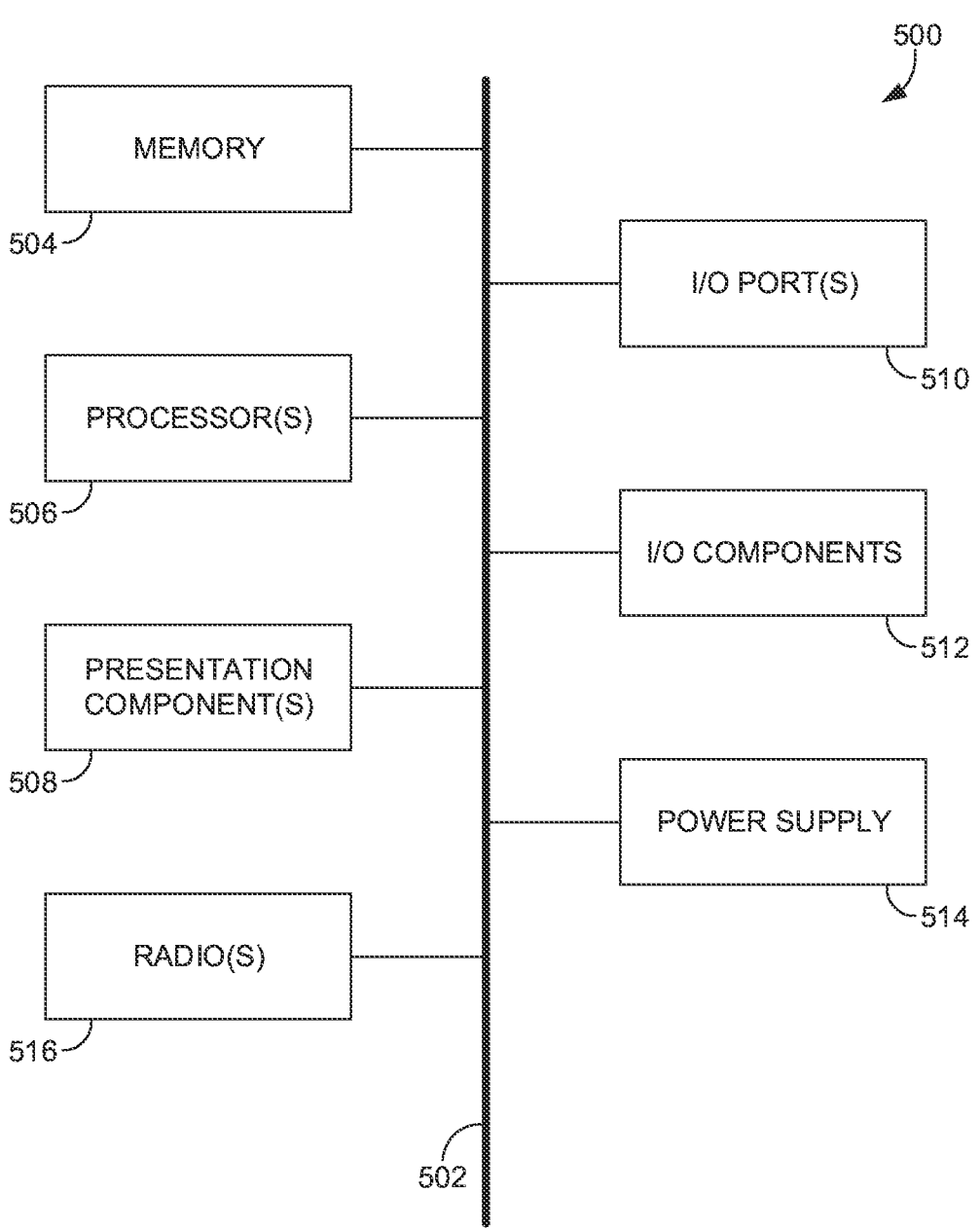
FIG. 5 depicts an example user device suitable for use in implementations of the present disclosure, in accordance with aspects herein.

As illustrated in FIG. 5, example user device 500 includes a bus 502 that directly or indirectly couples the following devices: memory 504, one or more processors 506, one or more presentation components 508, one or more input/output (I/O) ports 510, one or more I/O components 512, a power supply 514, and one or more radios 516.

Example user device 500 may be configured to wirelessly communicate (e.g., by transmitting or receiving one or more signals) with one or more of the antenna elements of FIG. 1 or FIG. 1, other types of wireless telecommunication devices (e.g., other user devices, network nodes), or one or more combinations thereof. In embodiments, the user device 500 may include one or more of a unit, a station, a terminal, or a client, for example. In some embodiments, the user device 500 may act as a relay. In some embodiments, the user device 500 may be a wireless local loop station, an IoT device, an Internet of Everything device, a machine type communication device, an evolved or enhanced machine type communication device, another type of user device, or one or more combinations thereof.

Bus 502 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component, such as a display device, to be an I/O component. Also, processors have memory. Accordingly, FIG. 5 is merely illustrative of an exemplary user device that can be used in connection with one or more embodiments of the technology disclosed herein.

User device 500 can include a variety of computer-readable media. Computer-readable media can be any available media that can be accessed by user device 500 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 504 includes computer storage media in the form of volatile and/or nonvolatile memory. The memory 504 may be removable, non-removable, or a combination thereof. Example hardware devices of memory 504 may include solid-state memory, hard drives, optical-disc drives, other hardware, or one or more combinations thereof. As indicated above, the computer storage media of the memory 504 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 500, or one or more combinations thereof.

The one or more processors 506 of user device 500 can read data from various entities, such as the memory 504 or the I/O component(s) 512. The one or more processors 506 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 506 can execute instructions, for example, of an operating system of the user device 500 or of one or more suitable applications.

The one or more presentation components 508 can present data indications via user device 500, another user device, or a combination thereof. Example presentation components 508 may include a display device, speaker, printing component, vibrating component, another type of presentation component, or one or more combinations thereof. In some embodiments, the one or more presentation components 508 may comprise one or more applications or services on a user device, across a plurality of user devices, or in the cloud. The one or more presentation components 508 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof.

The one or more I/O ports 510 allow user device 500 to be logically coupled to other devices, including the one or more I/O components 512, some of which may be built in. Example I/O components 512 can include a microphone, joystick, game pad, satellite dish, scanner, printer, wireless device, and the like. The one or more I/O components 512 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 508 on the user device 500. In some embodiments, the user device 500 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 500 may, additionally or alternatively, be equipped with accelerometers or gyroscopes that enable detection of motion. In some embodiments, the output of the accelerometers or gyroscopes may be provided to the one or more presentation components 508 of the user device 500 to render immersive augmented reality or virtual reality.

The power supply 514 of user device 500 may be implemented as one or more batteries or another power source for providing power to components of the user device 500. In embodiments, the power supply 514 can include an external power supply, such as an AC adapter or a powered docking cradle that supplements or recharges the one or more batteries. In aspects, the external power supply can override one or more batteries or another type of power source located within the user device 500.

Some embodiments of user device 500 may include one or more radios 516 (or similar wireless communication components). The one or more radios 516 can transmit, receive, or both transmit and receive signals for wireless communications. In embodiments, the user device 500 may be a wireless terminal adapted to receive communications and media over various wireless networks. User device 500 may communicate using the one or more radios 516 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 516 may facilitate communication via radio frequency signals, frames, blocks, transmission streams, packets, messages, data items, data, another type of wireless communication, or one or more combinations thereof. The one or more radios 516 may be capable of transmitting, receiving, or both transmitting and receiving wireless communications via mm waves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A modular antenna comprising:
a first set of antenna elements configured to transmit on three different frequency bands;
a second set of antenna elements, arranged on a vertical column, configured for a dedicated band having a higher frequency than the three different frequency bands of the first set of antenna elements; and
a third set of antenna elements, arranged on a vertical column, configured for a dedicated band having a higher frequency than the second set of antenna elements, wherein the number of the first set of antenna elements is less than the number of the second set of antenna elements, which is less than the number of the third set of antenna elements.

2. The modular antenna according to claim 1, wherein the dedicated band of the third set of antenna elements is a millimeter wave.

3. The modular antenna according to claim 2, wherein a distance between the first set of antenna elements and the second set of antenna elements of the modular antenna is a different distance than the distance between the second set of antenna elements and the third set of antenna elements.

4. The modular antenna according to claim 2, wherein the modular antenna is configured for dual stream multiple-input multiple-out 2×2 communications.

5. The modular antenna according to claim 1, wherein the second set of antenna elements and the third set of antenna elements of the modular antenna each have separate and unconnected printed circuit boards.

6. The modular antenna according to claim 2, wherein the first set of antenna elements, the second set of antenna elements, and the third set of antenna elements each have an individual dedicated reflector, and wherein the second set of antenna elements are arranged on the vertical column such that a first pair of the second set of antenna elements are positioned above a second pair of the second set of antenna elements.

7. The modular antenna according to claim 6, wherein one of the three different frequency bands is a low-band frequency.

8. The modular antenna according to claim 7, wherein two of the three different frequency bands are mid-band frequencies.

9. The modular antenna according to claim 8, wherein the dedicated band of the second set of antenna elements is a high-band frequency.

10. The modular antenna according to claim 1, wherein each of the first set of antenna elements, the second set of antenna elements, and the third set of antenna elements have the same gain.

11. A method for providing telecommunication services to a user device via a modular antenna, the method comprising:
transmitting a first frequency band from a first set of antenna elements of a first vertical column of the modular antenna;
transmitting a second frequency band from a second set of antenna elements of a second vertical column of the modular antenna; and
transmitting a third frequency band from a third set of antenna elements of a third vertical column of the modular antenna, wherein the first frequency band is lower frequency band than the second frequency band and the second frequency band is a lower frequency band than the third frequency band, and wherein a number of the first set of antenna elements is lower than the number of the second set of antenna elements and the number of the second set of antenna elements is lower than the number of the third set of antenna elements.

12. The method according to claim 11, wherein a distance between the first vertical column and the second vertical column of the modular antenna is the same distance between the second vertical column and the third vertical column.

13. The method according to claim 11, wherein the third frequency band is a millimeter wave.

14. The method according to claim 13, wherein the first frequency band is a low-band frequency and the second frequency band is a high-band frequency.

15. The method according to claim 13, wherein each of the first set of antenna elements, the second set of antenna elements, and the third set of antenna elements have the same gain.

16. The method according to claim 15, wherein the first vertical column, the second vertical column, and the third vertical column each have separate and unconnected printed circuit boards.

17. The method according to claim 15, wherein the first vertical column, the second vertical column, and the third vertical column each have an individual dedicated reflector.

18. A modular antenna comprising:
a first portion having a first set of antenna elements configured to transmit one or more millimeter wave frequency bands;
a second portion having a second set of antenna elements configured to transmit one or more frequency bands having a lower frequency band than the one or more millimeter wave frequency bands, wherein the second portion surrounds the first portion, and wherein a number of the first set of antenna elements is larger than the number of the second set of antenna elements; and
a third portion having a third set of antenna elements configured to transmit one or more frequency bands having a lower frequency band than the one or more frequency bands of the second portion, wherein the third portion surrounds the second portion, and wherein a number of the second set of antenna elements is larger than the number of the third set of antenna elements.

19. The system of claim 18, wherein each of the first set of antenna elements, the second set of antenna elements, and the third set of antenna elements have the same gain.

20. The system of claim 19, wherein the first portion, the second portion, and the third portion each have an individual dedicated reflector and separate and unconnected printed circuit boards.

\* \* \* \* \*